(12) United States Patent
Genet et al.

(10) Patent No.: US 11,377,135 B2
(45) Date of Patent: Jul. 5, 2022

(54) STEERING COLUMN ENERGY ABSORBING DEVICE MESHING PLATE

(71) Applicant: Robert Bosch Automotive Steering Vendôme, Vendome (FR)

(72) Inventors: Nicolas Genet, Coulommiers la Tour (FR); Stéphane Thebault, Aze (FR); Jérémy Renard, Naveil (FR)

(73) Assignee: ROBERT BOSCH AUTOMOTIVE STEERING VENDÔME, Vendôme (FR)

( * ) Notice: Subject to any disclaimer, the term of this patent is extended or adjusted under 35 U.S.C. 154(b) by 82 days.

(21) Appl. No.: 16/971,100

(22) PCT Filed: Feb. 27, 2019

(86) PCT No.: PCT/FR2019/050455
§ 371 (c)(1),
(2) Date: Aug. 19, 2020

(87) PCT Pub. No.: WO2019/186004
PCT Pub. Date: Oct. 3, 2019

(65) Prior Publication Data
US 2021/0114650 A1     Apr. 22, 2021

(30) Foreign Application Priority Data
Mar. 26, 2018   (FR) ...................................... 1852613

(51) Int. Cl.
*B62D 1/19*     (2006.01)
(52) U.S. Cl.
CPC ................................... *B62D 1/195* (2013.01)

(58) Field of Classification Search
CPC ...................................................... B62D 1/195
See application file for complete search history.

(56) References Cited

U.S. PATENT DOCUMENTS

| | | | |
|---|---|---|---|
| 9,376,136 B2 * | 6/2016 | Yoshihara | B62D 1/195 |
| 2012/0024101 A1 * | 2/2012 | Schnitzer | B62D 1/195 |
| | | | 74/492 |
| 2013/0074641 A1 * | 3/2013 | Schnitzer | B62D 1/184 |
| | | | 267/158 |
| 2013/0118292 A1 * | 5/2013 | Sulser | B62D 1/185 |
| | | | 74/493 |

(Continued)

FOREIGN PATENT DOCUMENTS

| CN | 101824970 A | 9/2010 |
|---|---|---|
| CN | 1070802085 A | 8/2017 |

(Continued)

OTHER PUBLICATIONS

International Search Report for corresponding application PCT/FR2019/050455 filed Feb. 27, 2019; dated Jul. 10, 2019.

*Primary Examiner* — Drew J Brown
(74) *Attorney, Agent, or Firm* — Cantor Colburn LLP

(57) ABSTRACT

The present invention relates to a meshing plate (10) of a steering column energy absorbing device, comprising a base plate (9) formed of a first material and comprising a row of first meshing shapes (91) extending along a longitudinal axis (A); the meshing plate comprises lateral protrusions (11) overmoulded onto said base plate so that each comprises a rear abutment surface (92) and/or a lateral bearing surface (93).

10 Claims, 4 Drawing Sheets

(56) References Cited

U.S. PATENT DOCUMENTS

2013/0327176 A1* 12/2013 Domig .................. B62D 1/192
74/492

FOREIGN PATENT DOCUMENTS

| CN | 107499371 A | 12/2017 |
|---|---|---|
| DE | 102008007094 A1 | 9/2009 |
| DE | 102010036891 A1 | 12/2011 |
| JP | 2003054424 A | 2/2003 |
| WO | 2009147325 A1 | 12/2009 |

* cited by examiner

STEERING COLUMN ENERGY ABSORBING DEVICE MESHING PLATE

The present invention concerns the field of vehicle steering columns. The present invention more particularly concerns a meshing plate of an energy absorbing device intended to be mounted on a steering column and adapted to absorb energy in the event of a front end impact to the vehicle.

Modern automobile vehicles are for the most part equipped with a system enabling adjustment of the steering wheel in depth and in height. The adjustment in depth is effected with a system of telescopic tubes at the level of the steering column. A clamping system enables adjustment of the steering wheel in an unlocked position and retention of the steering wheel in the desired position in a locked position.

In the situation of a front end impact the system of telescopic tubes is used to provide the travel necessary for absorbing the energy caused by the driver hitting the airbag and the steering wheel. This travel is greater than the adjustment travel of the steering wheel and may contain a part of the latter. A friction or deformation system generates the force that, in association with the movement, absorbs the energy. This system often necessitates an axial rack or meshing plate enabling adjustment in any position but also activating the absorption system. This rack is therefore used only in the extreme case of a vehicle collision.

This indispensable function can therefore be costly if the elements that constitute it are dedicated, adding as many components to the steering column, which increases production costs.

The technical problem that the invention aims to solve is therefore to optimize further the design of energy absorbing systems.

To this end, a first subject matter of the invention is a meshing plate of a steering column energy absorbing device, comprising a base plate comprising a row of first meshing shapes enabling meshing of other meshing shapes with these first meshing shapes. For example the first meshing shapes may be holes, thus enabling meshing with teeth. Generally speaking, the row of first meshing shapes extends along a longitudinal axis.

The meshing plate according to the invention further comprises lateral protrusions projecting from either side of the base plate and its longitudinal axis, these lateral protrusions being overmoulded onto said base plate in such a manner that each of these lateral protrusions has a rear abutment surface, in particular substantially orthogonal to said longitudinal axis, and/or a lateral bearing surface relative to the longitudinal axis.

This meshing plate is therefore adapted to provide functions other than that of absorbing energy in the event of a front end impact.

It is intended to absorb energy in the event of a front end impact in the classic manner. To this end it is intended to be fixed to an upper tube that slides toward and cooperates with a lower tube. When a mechanism with a meshing member is fixed to this lower tube and adapted to mesh with the meshing plate. This mechanism and the meshing plate form the energy absorbing device.

Thanks to the rear abutment surfaces this meshing plate will be able also to provide other functions:
providing an abutment for adjusting the extension of the upper tube relative to the lower tube, thanks to the rear abutment surfaces.

Alternatively or additionally, thanks to the lateral bearing surfaces this meshing plate will be able to provide other functions:
absorbing torque to limit the rotation of the mobile part of the steering column relative to the fixed part, thanks to the lateral bearing surfaces,
recentring the mobile part of the steering column relative to its fixed part, also thanks to the lateral bearing surfaces.

Thus the number of components is reduced by having a common part for these functions.

This therefore enables reduction of the economic weight of the elements constituting the steering column. This also optimizes the assembly phase, by simplifying manipulation and inspection, thus leading to reduction of production costs.

Finally, simplification of the concept reflects an increase in the accuracy of the product by a reduction of tolerances and the quantity of links in the chains of dimensions necessary for verifying the correct operation of the system under all conditions.

The meshing plate according to the invention may optionally have one or more of the following features:
the base plate is made of a first material and the lateral protrusions are made of one or more materials having a coefficient of friction less than of the first material; this enables reduction of the noise caused by friction when sliding; in particular, this enables so-called "unctuous" sliding during adjustment;
the first material is a metal; it has very high strength in the event of a front end impact;
each lateral protrusion comprises a first portion carrying the rear abutment surface and a second portion carrying the lateral bearing surface;
the first and second portions are bi-injection moulded onto the base plate;
the first portion is made of plastic, elastomer, foam material or a combination of materials absorbing vibrations and/or friction; this in particular enables noise to be absorbed upon the end of travel contact during depthwise adjustment of the steering column in its maximum extended position;
the base plate comprises lateral protrusions around which at least the second portion is overmoulded; these lateral projections form shapes inside the second portion that withstand high stresses on the lateral protrusions and the bearing surfaces;
the lateral bearing surfaces are convex; this enables reduction of the area in contact and therefore limitation of the friction caused by the contact with an element of the steering column intended to receive this meshing plate, in particular the clamping walls, that is clamped to immobilize the steering column at a given depth;
at least one of the lateral protrusions, in particular its second portion when present, features a leaf spring directly connected to that lateral protrusion and adapted to be stressed elastically when a force is exerted from the top of the meshing plate toward the bottom of the latter, the underside of the meshing plate being adapted to be fixed against a tube of a steering column intended to receive that meshing plate; this leaf spring may be in one piece with the second portion or supported by the lateral bearing surfaces by virtue of a different shape or a more rigid material such as a metal.

Another subject matter of the invention is a steering column comprising:
a lower base intended to be connected to the chassis of a vehicle and comprising clamping walls, an upper tube arranged between these clamping walls in such a manner as to slide in said lower base along a sliding axis and between an extended position and a retracted position, a clamping mechanism adapted to clamp the clamping walls toward one another so as to immobilize the upper tube in the lower base, an energy absorbing device comprising a meshing member fastened to the lower base and mobile between engagement and disengagement positions.

According to this other subject matter of the invention, this steering column further comprises a meshing plate according to the invention fixed to the upper tube in such a manner that:

said longitudinal axis is substantially parallel to the sliding axis, the meshing member meshes with said first meshing shapes in the engagement position and is disengaged from the latter in the disengagement position, the rear abutment surface is in contact against a front abutment of the lower base in the extended position, and/or the lateral bearing surface is spaced from or in sliding contact against longitudinal rails fixed relative to the rear base, when the clamping walls are unclamped, and is gripped as in a vice by the clamping walls then they are clamped.

The steering column therefore has the advantages of the meshing plate according to the invention.

The steering column according to the invention may optionally have one or more of the following features:

the second material is a material able to absorb vibrations of said front abutment against said rear abutment surface along an axis substantially parallel to the longitudinal axis, corresponding to a rate of movement of the front abutment surface relative to the rear abutment surface of 0.3 to 0.5 m·s$^{-1}$, this enables reduction of noise caused by the abutments impacting against one another at the end of travel when the steering column is extended to the maximum;

the lateral bearing surfaces are such that and the third material is a material such that the clamping of the clamping walls against the lateral bearing surfaces:

resists by friction movement of the lateral bearing surfaces by sliding against the clamping walls along an axis substantially parallel to the longitudinal axis, and/or resists a torque of 300 N·m exerted on the lateral bearing surface and tending to cause the upper tube to turn relative to the lower base;

the lower base comprises longitudinal rails against which the leaf spring or leaf springs are arranged under elastic stress.

In the examples shown the terms "under", "above", "below", "lower", "upper", "front", "rear", "in front", "behind", "vertical", "horizontal", "transverse" refer, unless otherwise indicated, to the orientation of the meshing plate according to the invention or of the steering column according to the invention that they are intended to assume when mounted in a vehicle.

Other features and advantages of the invention will become apparent on reading the detailed description of the following nonlimiting examples, for an explanation of which reference will be made to the appended drawings, in which:

FIGS. 1 to 4 show a steering column comprising an upper tube 1 sliding relative to a lower base 2, thus enabling adjustment in the depthwise direction of the steering wheel and the necessary travel in the event of a front end impact.

Figure 1:
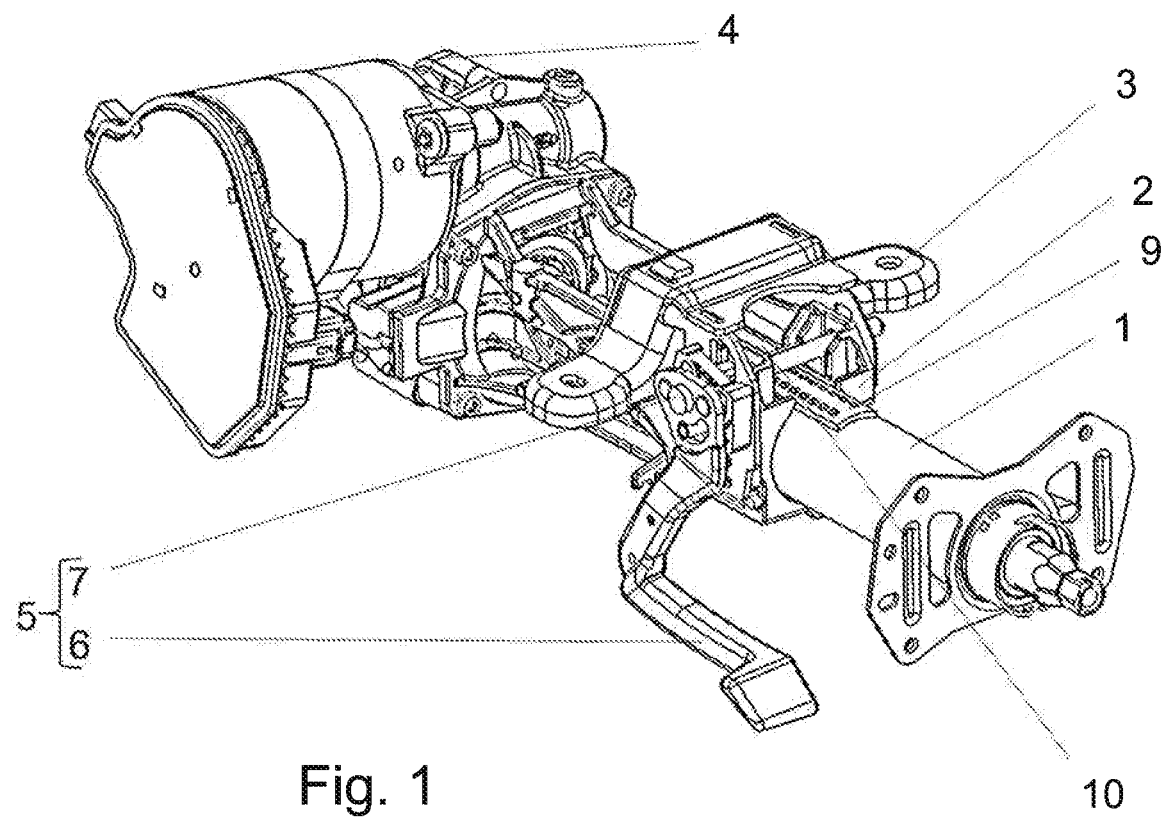
FIG. 1 is a perspective view of a steering column according to the invention, seen from behind, that is to say toward the front of the vehicle.
Figure 2:
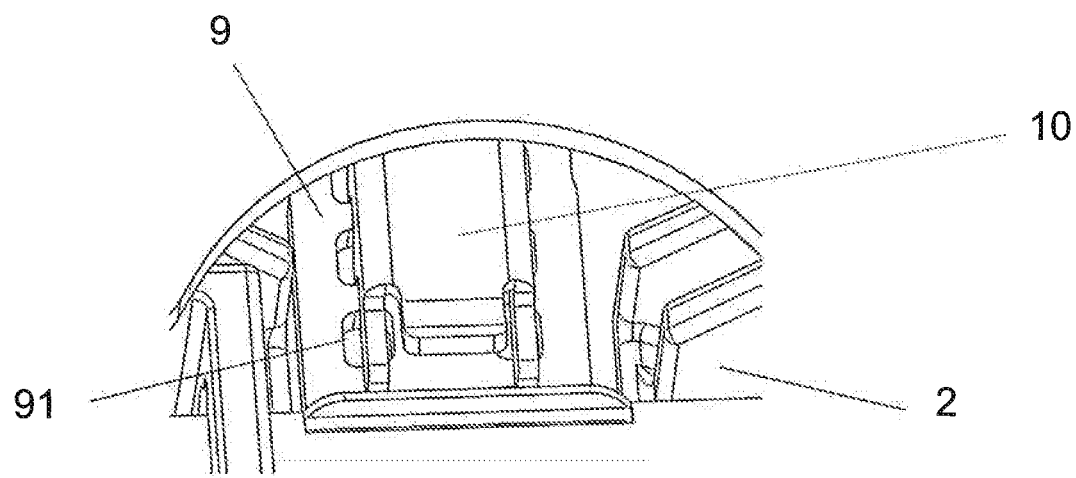
FIG. 2 represents a detail of FIG. 1, seen from a higher viewing angle.
Figure 3:
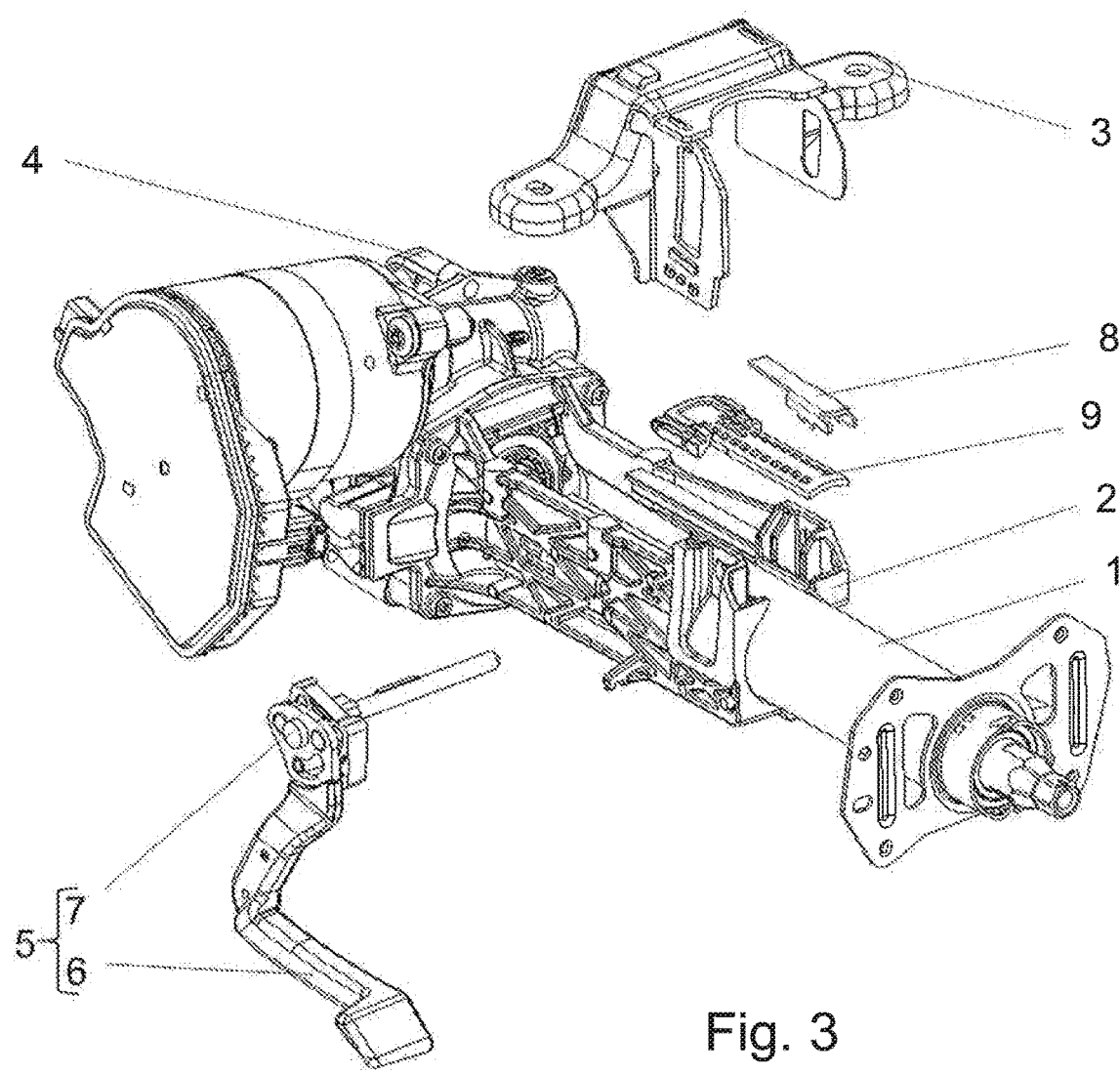
FIG. 3 is an exploded view of FIG. 1.
Figure 4:
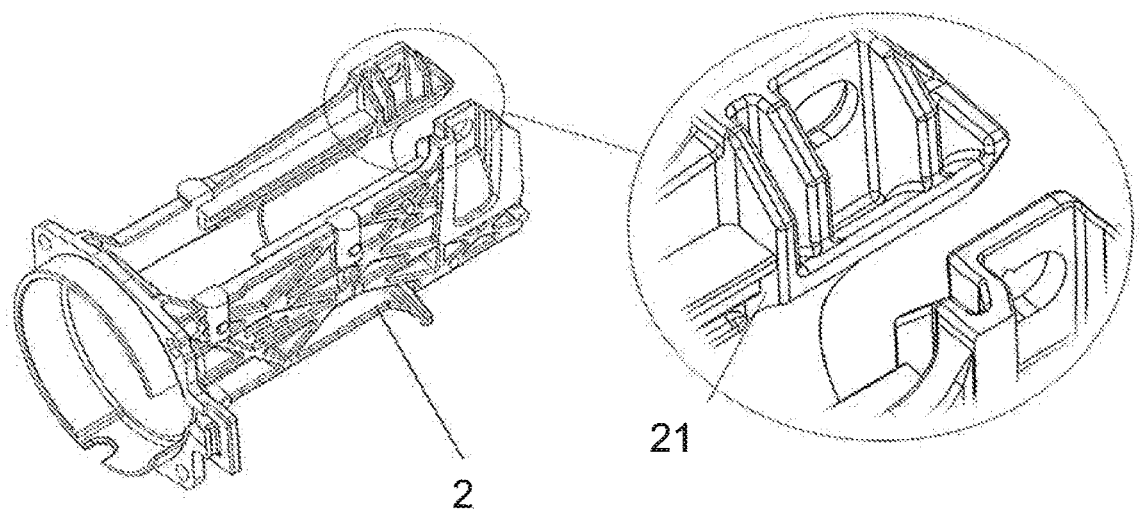
FIG. 4 represents the lower base of the steering column from FIG. 1 in perspective, from in front and toward the rear of the vehicle, with an enlargement, placed on the right in FIG. 4.

Here the lower base 2 comprises two clamping walls the internal surfaces of which form a tube receiving the upper tube 1. Hereinafter the base will be referred to as the lower tube 2, because of the internal shape of these clamping walls.

These tubes 1 and 2 are connected to the structure of the vehicle by an upper lug 3 and a pivot lug 4. A clamping mechanism 5 enables immobilization by friction of the column in the chosen adjustment position. This mechanism comprises a lever 6 connected to a clamping screw 7.

Here a meshing plate 10 is fixed to the upper tube 1. It comprises a base plate 9, here made of metal, connected to the upper tube 1 by riveting, screwing, clamping, welding or other fixing means.

This bottom plate 9 has a finite quantity of first meshing shapes, formed here by holes 91.

The steering column comprises an energy absorbing device including a meshing member, here a toothed member 8, connected to a fusible and/or deformable member of the energy absorbing device. For reasons of the clarity of the drawing, only the toothed member 8 is represented in these figures. In the engagement position the toothed member 8 meshes with some of the holes 91.

When the absorption device is mounted on the lower tube 2, in the engagement position the upper tube 1 is then immobilized in the lower tube 2 by clamping it there and the teeth of the toothed member 8 are engaged in the holes 91 in the meshing plate 10. The toothed member 8, the fusible and/or deformable member and the meshing plate 10 therefore form the energy absorbing device.

To adjust the position of the steering wheel the user actuates the lever 6, driving the toothed member toward a disengagement position: the meshing system is then deactivated. The upper tube 1 is then able to slide in the lower tube 2.

Once the adjustment has been effected, actuating the lever 6 in the opposite direction drives the toothed member in the opposite direction, and it meshes again in the holes 91 in the base plate 9.

In the event of a front end impact, forces in opposite directions are exerted on the meshing plate 10 and on the teeth of the toothed member 8, respectively, leading to deformation and/or breaking of a deformation element in this engagement device. This deformation enables at least some of the energy of a front end impact to the vehicle to be absorbed.

The toothed member 8 may for example be fixed to the clamping screw 7 or to a part fixed to the lower tube 2.

Figure 5:
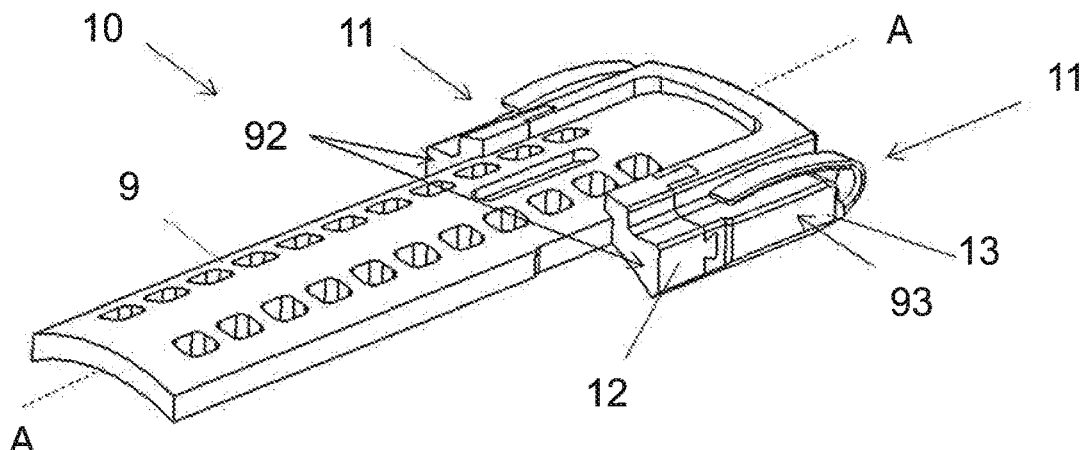
FIG. 5 represents a perspective view of a meshing plate according to the invention, here of the column from FIG. 1, seen from behind toward the front of the vehicle.

As shown in the FIG. 5 example the meshing plate 10 according to the invention comprises lateral protrusions 11, here made of plastic and overmoulded onto the base plate 9.

Each of these lateral protrusions 11 is formed here by bi-injection moulding a first portion 12 and a second portion 13 onto this base plate 9. In other words, in this example shown, each portion forms part of a lateral protrusion 11.

Each lateral protrusion 11 has a rear abutment surface 92, here substantially orthogonal to said longitudinal axis A and carried by the first portion 12.

Thus, as can be seen, a rear abutment surface 92 is present on each side of the base plate 9 and oriented toward the rear of the latter, so that in the extended position, which corresponds to the extreme axial adjustment of the steering column, in which the steering wheel is closest to the driver, the rear abutment surfaces 92 come into contact with the lower tube 2 on front abutments 21 oriented to oppose axial movement, as shown in FIGS. 4 and 7 to 9. These abutments have the advantage of limiting travel. This imparts an additional function to the base plate 9.

Moreover, the material of the first portion 12 has a hardness lower than that of the metal forming the base plate 9. This base plate 9 therefore also enables abutment noise to be absorbed, in particular in order to produce a sensation that is comfortable for the driver.

Moreover, each lateral protrusion 11 is extended on the longitudinal axis A of the meshing plate 10 by the second portion 13, which here has a lateral bearing surface 93 substantially parallel to the longitudinal axis A, substantially orthogonal to the rear abutment surface 92 and carried by the second portion 13.

Here the second portion 13 is made of a third material having a coefficient of friction less than that of the metal forming the base plate 9. This base plate 9 therefore also enables resistance to the clamping by the clamping walls, in particular resistance to a force on the steering wheel and to a torque tending to cause the upper tube 1 to turn relative to the lower tube 2.

Figure 10:
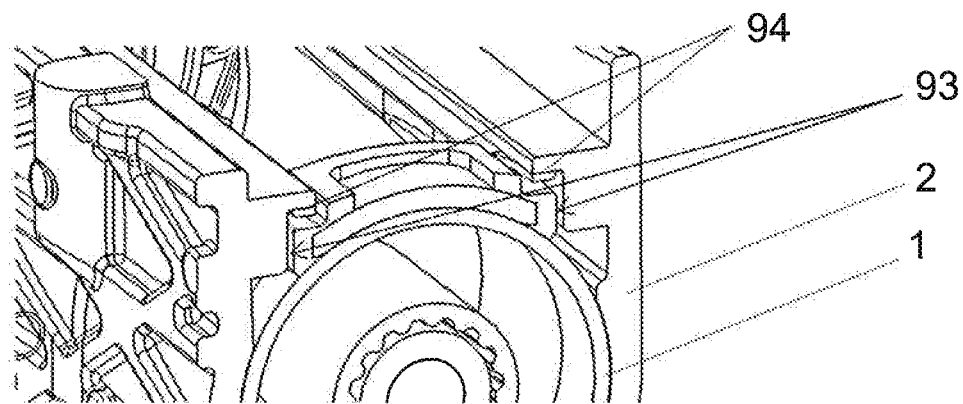
FIG. 10 is a cross section on the sliding axis of the tubes enabling the cooperation of the lateral bearing surfaces and the leaf springs to be seen.

These lateral bearing surfaces 93 are spaced from the rear abutments 21 of the lower base 2 in normal use and are favoured contact areas when a torque is applied to the mobile parts such as the upper tube 1. The force generated will then cause these bearing surfaces 93 to come into contact with or to stress the support elements like the lower base 2, in particular longitudinal rails of the latter, as can be seen in FIG. 10.

Finally, the meshing plate 10 may integrate at least one section 94, here formed of a basic leaf spring made of the same material as the second portion 13, enabling a low force to be exerted on the fixed elements like the lower base 2. In particular, this leaf spring 94 may be made to slide against a longitudinal upper guide rail of the lower base 2.

The function of this force is to recentre the angular position of the upper tube 1 relative to the support elements, that is to say the lower base 2 and the lugs 3, and thus to revert to the initial clearance between the aforementioned bearing surfaces.

Figure 6:
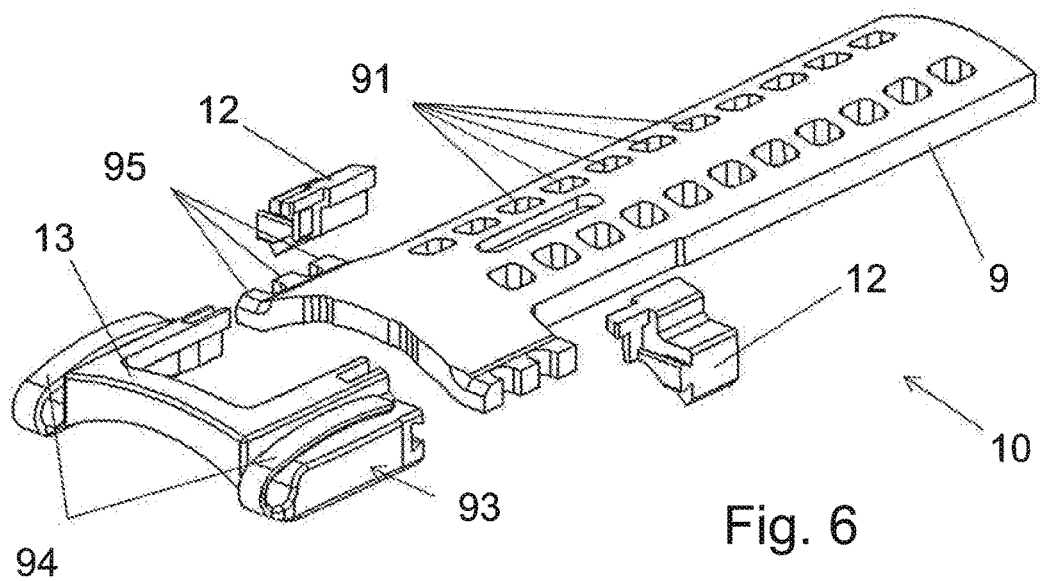
FIG. 6 is an exploded view of FIG. 5, seen from the front toward the rear of the vehicle.
Figure 7:
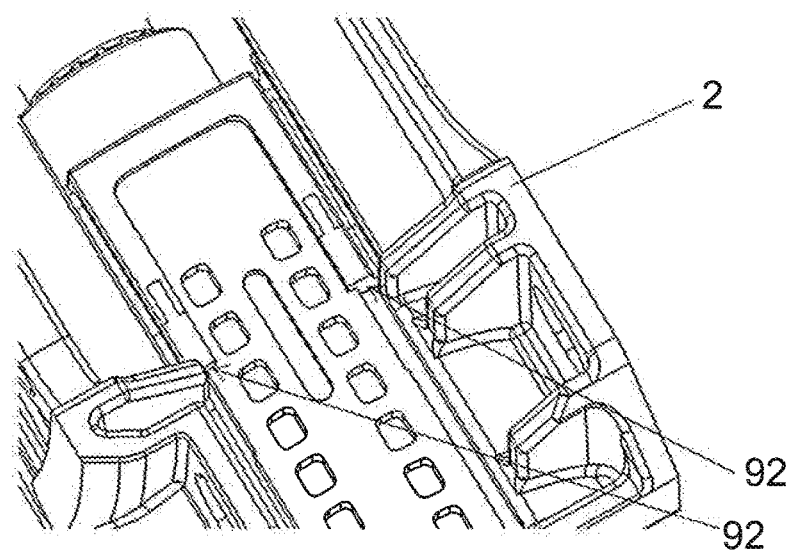
FIGS. 7 to 9 are partial representations of the plate according to FIG. 5 cooperating in the steering column, in the extended position, respectively seen essentially from above from behind in the case of FIGS. 7 and 8 and from the front in the case of FIG. 9.
Figure 8:
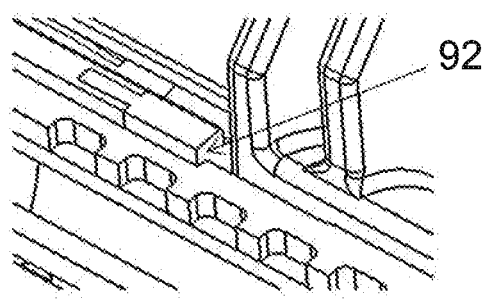
Figure 9:
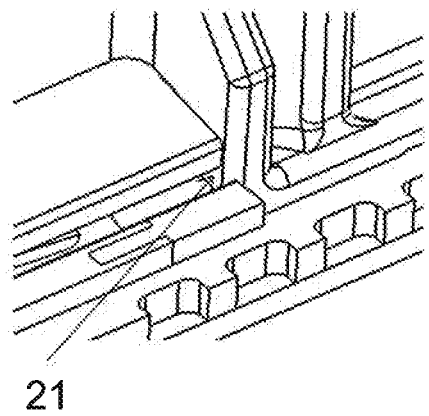

As shown in FIG. 6, this base plate 9 may also have an interior shape 95, here forming lateral projections, to withstand high stresses, in particular crushing stresses, on the lateral protrusions 11. This architecture then enables strengthened resistance to abutment impacts between the rear abutment surfaces 92 of the plate 9 and the front abutments 21 during axial adjustment. It also enables strengthening of the resistance to high torques between the upper tube 1 and the lower tube 2 by way of the contact between the lateral bearing surfaces 93 and the support elements like the lower tube 2 for example.

Note that the lateral protrusions 11 may not only be made of plastic material but also of elastomer, foam or a combination of materials absorbing vibrations or friction.

The lateral bearing surfaces 93 may also be of convex or other shape enabling reduction of the area in contact and thus limitation of the friction caused by the contact with the support elements.

The leaf springs 94 may also be sized to withstand the high torques described above and that the bearing surfaces 93 withstand by virtue of a different shape or a more rigid material such as a metal.

With the idea of optimization, the system may equally integrate a single leaf spring 94 by favouring a side remaining in contact in normal use. This unilateral clearance is then positioned to withstand the highest torques if one orientation is to be favoured The advantage of the invention is therefore to integrate a plurality of compatible materials in order to address different requirements with the same component, each material being adapted to specific stresses (static force, high-speed impact, absorption of noise . . . ). Accordingly, during assembly of the system the component formed by the meshing plate is unique. This simplifies assembly of the steering column.

Note that the second portion may be made of a material, for example with a Shore A hardness of 85, such as a thermoplastic polyurethane (also known as TPU).

The advantage of the invention also resides in integrating as many functions as possible into one component in order to limit the economic impact through a reduced number of components. This optimization enables reduction of:

the number of tools and the resources necessary for tracking these components, the number of links necessary to produce chains of dimensions of the system and thus increased accuracy of the assembly or increased tolerances leading to a reduction of the production cost of the components, the number of components to be assembled and therefore reduction of the quantity of assembly and/or inspection operations.

The invention claimed is:

1. Meshing plate of a steering column energy absorbing device, comprising a base plate comprising a row of first meshing shapes enabling meshing of other meshing shapes with these first meshing shapes, the row of first meshing shapes extending along a longitudinal axis, the meshing plate being characterized in that it further comprises lateral protrusions projecting from either side of the base plate and its longitudinal axis, these lateral protrusions being overmoulded onto said base plate in such a manner that each of these lateral protrusions has a rear abutment surface and/or a lateral bearing surface relative to the longitudinal axis.

2. Meshing plate according to claim 1, characterized in that the base plate is made of a first material and the lateral protrusions are made of one or more materials having a coefficient of friction less than of the first material.

3. Meshing plate according to claim 2, characterized in that the first material is a metal.

4. Meshing plate according to claim 1, characterized in that each lateral protrusion comprises a first portion carrying the rear abutment surface and a second portion carrying the lateral bearing surface, and in that the first and second portions are by-injected onto the base plate.

5. Meshing plate according to claim 4, characterized in that the first portion is made of plastic, elastomer, foam material or a combination of materials absorbing vibrations and/or friction.

6. Meshing plate according to claim 4, characterized in that the base plate comprises lateral protrusions around which at least the second portion is over moulded.

7. Meshing plate according to claim 1, characterized in that the lateral bearing surfaces are convex.

8. Meshing plate according to claim 1, characterized in that at least one of the lateral protrusions features a leaf spring directly connected to that lateral protrusion and adapted to be stressed elastically when a force is exerted from the top of the meshing plate toward the bottom of the latter, the underside of the meshing plate being adapted to be fixed against a tube of a steering column intended to receive that meshing plate.

9. Steering column comprising:
a lower base intended to be connected to the chassis of a vehicle and comprising clamping walls,
an upper tube arranged between these clamping walls in such a manner as to slide in said lower base along a sliding axis and between an extended position and a retracted position,
a clamping mechanism adapted to clamp the clamping walls toward one another so as to immobilize the upper tube in the lower base,
an energy absorbing device comprising a meshing member fastened to the lower base and mobile between engagement and disengagement positions, characterized in that it further comprises a meshing plate according to claim 1 fixed to the upper tube in such a manner that:
said longitudinal axis is substantially parallel to the sliding axis,
the meshing member meshes with said first meshing shapes in the engagement position and is disengaged from the latter in the disengagement position,
the rear abutment surface is in contact against a front abutment of the lower base in the extended position, and/or
the lateral bearing surface is spaced from or in sliding contact against longitudinal rails fixed relative to the rear base, when the clamping walls are unclamped, and is gripped as in a vice by the clamping walls then they are clamped.

10. Steering column according to claim 9, characterized in that the meshing plate is according to claim 8, the lower base comprising longitudinal rails against which the leaf springs are arranged elastically stressed.

\* \* \* \* \*